United States Patent

Hasbrook

[15] 3,701,092

[45] Oct. 24, 1972

[54] VEHICULAR ATTITUDE-CONTROL DISPLAY

[72] Inventor: Albert Howard Hasbrook, Blanchard, Okla.

[73] Assignee: Stanley W. Wilcox, Tulsa, Okla.; a part interest

[22] Filed: Nov. 9, 1970

[21] Appl. No.: 88,070

Related U.S. Application Data

[63] Continuation-in-part of Ser. No. 654,571, July 19, 1967, abandoned.

[52] U.S. Cl. ............................. 340/27 AT, 33/204 C
[51] Int. Cl. ................................................. G08g 5/00
[58] Field of Search.33/204.2, 226; 340/27 AH, 282; 74/5.22, 5.6, 5.4, 5.41; 244/79; 335/151; 200/61.45, 61.46, 61.52

[56] References Cited

UNITED STATES PATENTS

| | | | |
|---|---|---|---|
| 2,663,008 | 12/1953 | McEwan | 33/204.2 |
| 1,856,436 | 5/1932 | Schueller | 33/204.2 |

FOREIGN PATENTS OR APPLICATIONS

| | | | |
|---|---|---|---|
| 1,134,273 | 11/1968 | Great Britain | 33/204.2 |

*Primary Examiner*—Ralph D. Blakeslee
*Attorney*—Head and Johnson

[57] ABSTRACT

Aircraft attitude, particularly roll attitude, is displayed principally by a visual light system. The lights are positioned within the pilot's peripheral vision space so as to give inattentive control stimulus.

14 Claims, 3 Drawing Figures

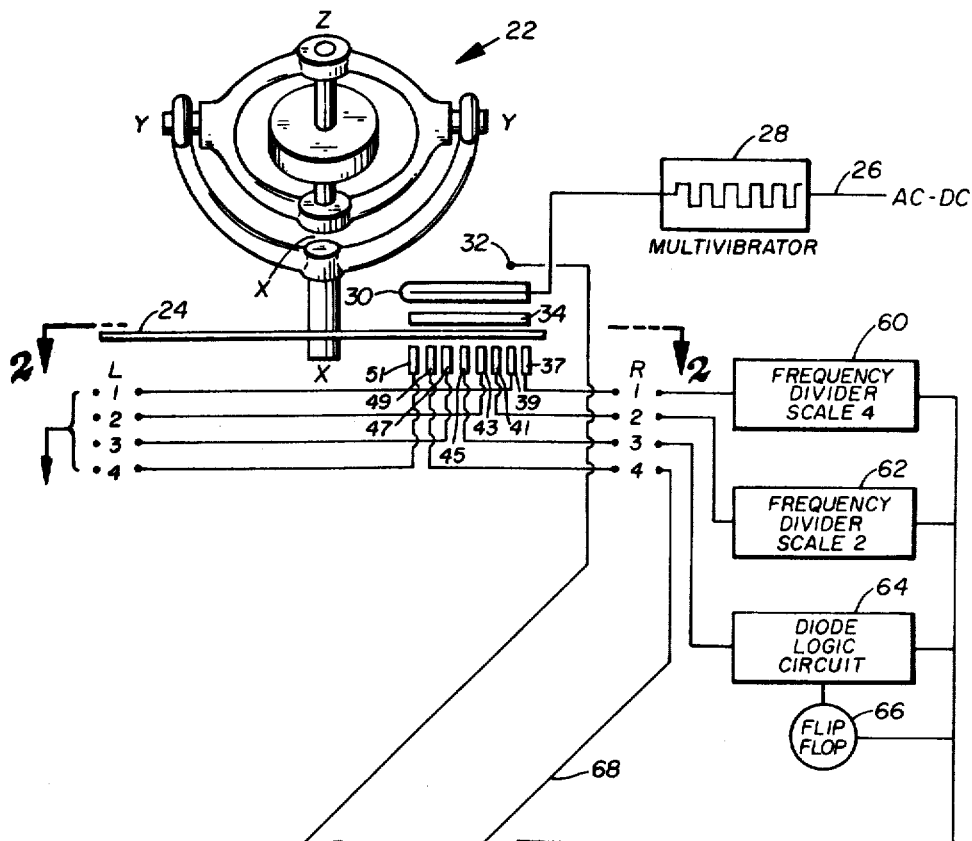
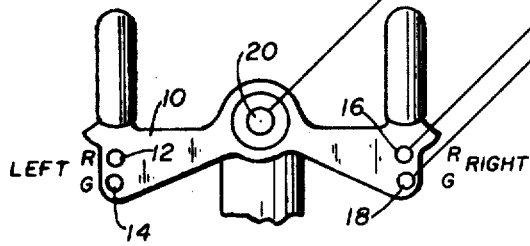
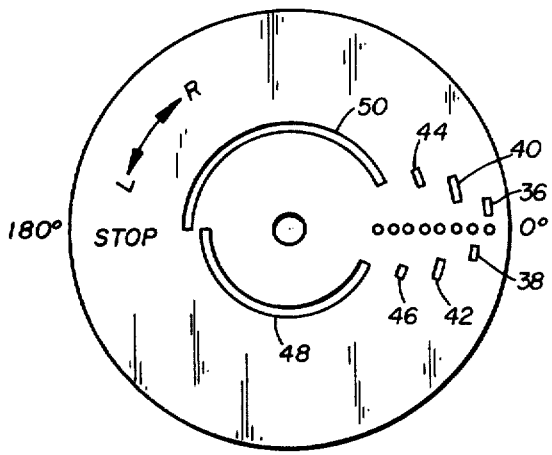
Fig. 1.
Fig. 2.
INVENTOR.
A. HOWARD HASBROOK

VEHICULAR ATTITUDE-CONTROL DISPLAY

CROSS-REFERENCE

This application is a continuation-in-part of copending application Ser. No. 654,571, filed July 19, 1967, now abandoned.

BACKGROUND OF THE INVENTION

This invention relates to a vehicular orientation controlling system, particularly to an aircraft roll attitude control system which is preferably achieved through an electrical light communication system indicative of the aircraft condition. Flying an aircraft under visual flight rules (VFR, a minimum of 1,000 foot celing and 3 miles visibility) when manually controlled by the pilot is by visual reference to ground or horizon. This is relatively a natural function as opposed to flying by reference only to the cockpit instruments, during instrument flight, in which visual reference to the ground or horizon is obscured from the pilot's view by weather phenomena such as clouds, snow, rain, dust, haze or fog (IFR), it is known that stimulus produced in the inner ear, and in the deep muscles of the lower torso by acceleration forces are incompatible with visual cues provided by aircraft instruments. A conflict in response requirement occurs when the pilot disbelieves randomly observed instrument instructions which are overriden by the strong and continuous sensation of balance and feel. In some instances he can inadvertently place an aircraft in an abnormal or hazardous attitude. In order to minimize such occurrences, instrument flight training stresses the requirement for absolute and confident dependence upon the pilot's visual senses with almost total disregard for the sensations of balance and kinesthesia. This complete dependence on vision requires substantially continuous scanning of the flight instruments to assure constant input of attitude information and to overcome the other senses. As such, instrument flying (IFR) is considered to be an unnatural human function on behalf of the pilot. As such, in order to create habit patterns, pilots are constantly undergoing instrument flight check and training in order to appraise their ability to fly safely by sole reference to the instruments.

Heretofore, the principal instruments used by a pilot to control his aircraft during instrument flight has consisted of six dial-type indicators. These are: air speed, artificial horizon, altimeter, vertical speed (rate of climb/descent), gyro compass, and turn and bank indicator. Of these, the attitude gyro, or artificial horizon, is perhaps the most important in that it provides essential information on both the pitch and roll attitude of the aircraft. Other forms of attitude signalling apparatus have been taught in the art such as the tilt indicator for gyroscope in U.S. Pat. No. 2,745,091; the gyro control attitude indicating and tracking apparatus shown in U.S. Pat. No. 2,709,797 of A. J. McEwan; and the approach light indicator system of McEwan U.S. Pat. No. 2,663,008. All of these instruments heretofore have been of such a design that they require the use of foveal vision to discern their indications. That is, the pilot must look directly at, and focus on, each indicator separately to obtain the information. Because of this, minimal scanning of the instruments is almost a full time job, even during routine IFR conditions. It has been found that recognition of visual stimulus requires at least one-fifth second and in some instances, the time required to react to the stimulus may be as high as two seconds. Therefore, when two or three instruments are viewed in succession, three to six seconds may elapse before the aircraft responds to the pilot's resulting input function. In aircraft susceptible to high rates of roll in turbulence, this lapse of time can result in excessive and hazardous bank angles if the pilot is delayed in resuming his instrument scan pattern.

However, the scanning of these flight instruments in many instances is interrupted periodically to take care of other duties, such as looking at other instruments or displays, studying navigational charts, computing fuel/range problems, changing radio frequencies or any one or more of a plurality of duties necessary to complete a successful flight, but yet are not directly associated with keeping the aircraft attitude properly orientated.

Of the three axis around which an aircraft can rotate, control of the roll axis is the most critical and most important in relation to control of speed and heading for any given power and trim condition. This is because an aircraft is usually less stable around its roll axis. During visual flight conditions, when visual reference to the horizon is available, a pilot has little trouble in maintaining his aircraft in proper attitude, even when diverting his visual attention to other tasks within the cockpit. It is believed that reference is maintained with the outside condition by peripheral vision which allows a pilot to subconsciously correct any undesired change in the aircraft's pitch or roll attitude. However, peripheral cues become non-existent during instrument condition because of loss of outside visual reference to the horizon, ground or other natural horizon. This forces the pilot to depend solely on his foveal or direct vision of instruments to obtain roll and pitch information from the attitude gyro.

SUMMARY

Accordingly it is an object of this invention to provide an aircraft visual attitude system that is so positioned as to operate within the peripheral vision of the pilot, especially effective during instrument flight conditions, to provide instantaneous and continuous attitude information, without employment of foveal or direct vision on behalf of the pilot. Thus such a system induces a natural response by the pilot for attitude control of the aircraft similar to that while flying under VFR conditions. That is, stimulus to movement, brightness and contrast impinging on the peripheral vision areas of the retina are used for information by which an aircraft can be controlled even though under IFR conditions.

This invention has for its further object the provision of an aircraft attitude and preferably roll control attitude system wherein visual light indicators are so positioned as to be outside of the pilot's normal foveal observational area in order to stimulate a basic human instinctive reaction for a given condition of the aircraft.

A still further object of the invention is to provide a visual aircraft roll attitude light signalling system which variably operates according to a particular aircraft roll attitude and yet provide such information to the pilot within his peripheral vision in order that he can react with appropriate control response.

A yet further object of this invention is to provide a visual signalling system for pilot's attitude control that has a fail safe system to maintain a pilot's reliance thereon.

A still further object of this invention is to provide an attitude control system which removes the heretofore usual requirement during IFR conditions of pilot discrimination and judgment between the spatially and unrelated roll display (i.e., artificial horizon) and the pilot's control device.

A yet further object of this invention is to provide an attitude control system wherein the aircraft roll display is in close proximity to the pilot's control device and is within the peripheral vision area when the pilot is observing other instruments. The space relationship of stimulus to the responsive control is so arranged that the pilot actually reacts to move away from the locale of the stimulus and in so doing corrects aircraft roll attitude. Such a system utilizes a heretofore neglected pilot's visual area closely related to with the control device so as to directly trigger subconscience attitude control.

These and other objects of the invention will become more apparent on further reading of the specification and claims when taken with drawings.

BRIEF DESCRIPTION OF THE DRAWINGS

FIG. 1 is a schematic and diagrammatic view depicting the basic essentials of this invention.

FIG. 2 is a view taken along the line 2—2 of FIG. 1 depicting the interruptive disc utilized in combination with a gyro and movable in accordance with aircraft roll attitude conditions.

DESCRIPTION OF THE PREFERRED EMBODIMENTS

Figure 3:
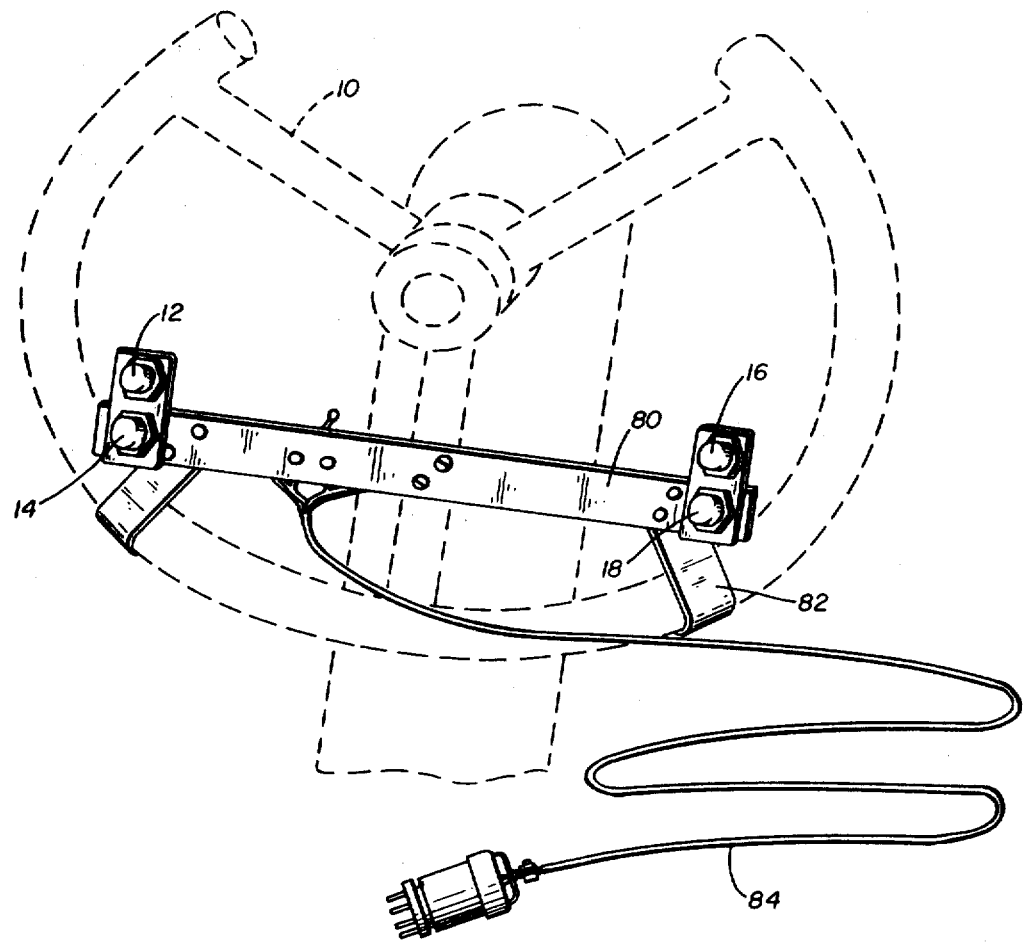
FIG. 3 is a perspective view of the visual indicating light bracket used with this invention as typically applicable for adaptation to existing pilot control wheels or sticks or other control devices.

In FIG. 1 a pilot's hand control device is diagrammatically depicted, utilizing this invention which comprises the placement of preferably an upper red light and/or reflector 12, vertically below which a green light and/or reflector 14 is positioned. Similarly on the right hand side red and green lights 16 and 18 are positioned on the pilot's control device 10. The positioning of the pair of lights is based on their providing peripheral vision cues or stimulus to the pilot yet not producing an irritating effect except as such effect is desired as a warning. Normally the lights function as roll information signals. Each pair of lights is preferably positioned on or in the control device contiguous to the handgrips and in such a way that they are not hidden from view by the pilot's hands or arms, and such that they are below the normal observational area, e.g., below a line of sight from a seated pilot as he directs his vision toward the bottom of primary flight instruments or through the windshield during flight. The lights are spaced horizontally apart from each other so as to permit positive and immediate right-left distinguishment to the pilot's peripheral vision. A fail-safe indicator such as light 20 is shown positioned upon the center of the control wheel, although its position thereon is not deemed to be of critical importance, as it may be placed as for example on the instrument panel itself or elsewhere.

The lights on the hand control device, as particularly described herein, are indicative of the roll attitude of the aircraft and as such are operated by and as a function of a common gyroscope schematically shown and designated generally by the numeral 22 with its primary axes S, Y, and Z, defined as spin axis Z, the pitch axis Y and the roll axis X. The roll axis shaft is connected to a light interruptor cylinder or disc 24, more aptly described in FIG. 2. The disc thus rotates as the roll axis of the aircraft changes. Associated with the disc is an electrical circuit capable of being operated with the usual aircraft electrical power supply system or completely independent therefrom whether it be AC or DC, the input of which is shown entering at 26. A multivibrator or "chopper" is adapted to actuate lamp 30 located on one side of the interruptor disc 24 at a rate preferably of about four cycles per second. A photocell 32 actuated by the lamp 30 actuates the fail-safe 'on' light 20. A condensing lens 34 is adapted to concentrate the light from lamp 30 into a substantially thin line upon disc 24.

Disc 24, referring to FIG. 2, opaque and preferably of a non-reflective color, includes a plurality of openings or windows particularly spaced for use in conjunction with the precepts of this invention. Openings 36 and 38 are in different radial distances from a common axis of the disc 24 and extend as a window between 3° and 10° on each side of the zero axis line of the disc 24. Similarly windows 40 and 42 extend in different coaxial planes on each side of the zero axis between 10° and 18° thereof. Likewise windows 44 and 46 provide light passage openings during 18° to 22° of rotation of the disc 24 from its zero position. Window 48 extends from 22° circumferentially until 180° from the zero position. Likewise slot or opening 50 extends on the other side of the zero axis from 22° to 180°. 180° is considered being comparable to a complete upside-down position of the aircraft, whereas zero is normal flight position.

For each of the eight different coaxially spaced windows or openings, corresponding photo diodes are adapted to operate. That is, photo diode 37 is adapted to operate in conjunction with window 36, diode 39 with window 38, etc. The circuitry for use in conjunction with this invention includes identical right and left portions, the right hand side of which is shown in this view. Typically such a system includes a scale 4 frequency divider 60 connected with diode 37 in this instance adapted to provide an output of one cycle per second to the green light on the right side. Similarly associated with window 40 and diode 41 a scale 2 frequency divider 62 is adapted to provide an output of two cycles per second to the green light. Diode 45, normally operable while window or slot 44 is between the light source and the diode is connected with a diode logic circuit 64 and a flip-flop 66 to convert the frequency input into a steady green light signal. In all of the instances utilizing dividers 60, 62 and the logic circuit and flip-flop 64 and 66, connection is made with the lower right hand green light 18. Diode 51, which is operable in conjunction with the light passing through slot 48 is directly connectable through conduit 68 to the red light located on the right hand side of the pilot's hand control device. The red light signal is four cycles per second, the same as multivibrator 28. Similar circuitry is used in conjunction with diodes 39, 43, 47, and 49 for the left hand lights.

In operation based on this preferred embodiment, a "negative" cue informs the pilot when he is in relatively level flight. That is, between the zero and 3° roll position none of the lights are on and hence would indicate to the pilot the absence of any appreciable or normally hazardous roll attitude. Thus, during long periods of level flight normally associated with cross-country flying, the cockpit environment would contain no added illumination. This covers a total roll angle of 6°. Between 3° and 10° of roll, the lower green light is set to flash at one flash per second, because of activation of frequency divider 60. From 10° to 18° the rate is doubled preferably to two flashes per second. A roll angle range of from 18° to 22° is set to illuminate steadily in this 4° range since such a roll angle is typical for turns used in aircraft holding patterns and hence would provide constant peripheral cue information that the pilot is in the proper bank. From 22° to 180° of bank, the green light is extinguished and the red light flashes at the rate of four cycles per second or at the rate of the input from the multivibrator or chopper. The above flash rates and roll angles are typical ones to describe the informational output of the invention. Other flash rates and angles would correspond to the specific roll characteristic and control requirements of a particular aircraft.

MODIFICATIONS

The invention has been described with reference to specific and preferred embodiments. It will be apparent, however, that other modifications can be made without departing from the spirit and scope of the invention. For example, it is to be understood that this invention includes adapting to being a part of existing control sticks, wheels or other roll control devices and as such the bracket attachment, shown in FIG. 3 is adaptable thereto which generally includes a frontal support plate 80 upon which the pairs of lights are placed and a clip 82 of any style or mode. Electrical connection 84 interconnects with the attitude output circuitry and gyro. Placement of the signal light system of this invention is not necessarily limited to placement in conjunction with the control devices as described herein or to placement in the operators normal upper and lower peripheral vision areas, as the lateral peripheral vision areas are also included in the concept of this invention.

When "pairs of lights" is used herein it is to be understood that this includes any form of visual light system which produces one of two colors. However, horizontally spaced single lights of suitable peripherally visible color are inclusive of the invention. For example, a single green light on the right and one on the left will suffice to act as peripheral vision stimulus for pilot attitude control by causing a rapid flashing signal for extreme roll attitude replacing the heretofore described red flashing signal. Preferably the control device used by the various aircraft manufacturers shall be molded or preformed to include installations of the light system of this invention as defined herein.

Although it is preferable to position the peripheral vision cue lights on the pilot's control device there are instances where it is feasible to place and space said lights elsewhere, as for example on the cockpit instrument panel normally exposed before the pilot and/or copilot. Typical of such a use includes, but is not limited to, aircraft used in pilot training. Such aircraft usually has a minimum of panel instruments or other detractors from the use therewith of the display lights of this invention. The lights may be positioned at other locations within the normal peripheral vision space of the pilot when normally oriented in his usual in-motion operational and navigational duties. As used herein the normal peripheral vision space is defined as that space where at least two separated signal lights, positioned substantially parallel to an axis transverse to the longitudinal axis of the vehicle, are located. That space is defined by an imaginary cone the axis of which is substantially parallel to the longitudinal axis of the vehicle with the apex substantially at the pilot's point of vision in his normal position as above-defined. The central apex angle of the cone is not more than about 160° and preferably about 120°.

As used herein "pilot" is meant to include copilot, flight engineer, and/or other persons involved in the control and navigation of the aircraft.

In addition, although a disc 24 has been shown utilizing this invention it is to be understood that a similar light interrupting effect may be constructed utilizing other geometrical forms actuated by the roll axis of the gyro. Also this invention can utilize other pick-off systems from a gyroscopically stabilized platform for input to the peripheral cue-light system. Accordingly this invention should be constructed not to be limited to the embodiment herein described but should be limited only by the scope of the appended claims.

What is claimed:

1. A vehicular in-flight attitude indicating system for a pilot's cockpit having a hand operated vehicular control device comprising normally horizontally spaced actuatable visual signals positioned on said pilot's hand control device, and means responsive to a change in roll attitude condition of said vehicle to actuate said signals and thus display said attitude to said pilot.

2. A system according to claim 1 wherein each of said spaced signals comprises a light source and, when actuated at one roll attitude produces a visual signal of a first color, and when actuated at another roll attitude produces a visual signal of a second color distinguishable from said first color.

3. A system according to claim 2 wherein each of said signals are pairs of light sources, one light source, of said pair, of said first color, and the other light source of said second color.

4. A system according to claim 3 wherein each of said pair of signals are vertically oriented and colors for each pair are red above green.

5. A system according to claim 4 including means to actuate one pair of signals relative to the degree of roll about an axis parallel to the longitudinal axis of said vehicle from a normal horizontal position approximately as follows:

| Degree of Roll | Visual Signal |
| --- | --- |
| 0° to 3° | none |
| 3° to 10° | green flashing 1 cps (cycle per second) |
| 10° to 18° | green flashing 2 cps |
| 18° to 22° | green steady |
| 22° to 180° | red flashing 4 cps. |

6. A system according to claim 1 wherein said signals are gyro activated.

7. A system according to claim 1 wherein said signals comprise a light of a single color.

8. A system according to claim 7 including means to actuate said light relative to the degree of roll about an axis parallel to the longitudinal axis of said vehicle from a normal horizontal position approximately as follows:

| Degree of Roll | Visual Signal |
| --- | --- |
| 0° to 3° | none |
| 3° to 10° | flashing light 1 cps |
| 10° to 18° | flashing light 2 cps |
| 18° to 22° | steady light |
| 22° to 180° | flashing light 4 cps. |

9. A vehicular in-flight attitude indicating apparatus for a pilot's cockpit comprising
   means attachable to a pilot's control wheel or stick so as to be oriented normally horizontally,
   vertically spaced pairs of visual signals attached to said means so as to be spaced to the right and left of a centerline of said wheel or stick,
   means to actuate said signals responsive to a given roll attitude condition of said vehicle.

10. An air or space vehicle roll attitude indicating system for a pilot's cockpit comprising
    a pilot's two hand grip control device,
    horizontally spaced pairs of actuatable lights, each pair positioned on said control device so as to be substantially contiguous to the normal grip position of either hand, each of said pairs oriented to provide a red actuatable light above a green actuatable light,
    a gyro responsive to the roll attitude of said vehicle, and
    means responsive to said gyro and connectable with said lights to provide actuation of a pair of lights relative to the direction of roll from horizontal, said means actuating said lights according to the following approximate attitude conditions:

| Degree of Attitude | Visual Signal |
| --- | --- |
| 0° to 3° | none |
| 3° to 10° | green flashing 1 cps |
| 10° to 18° | green flashing 2 cps |
| 18° to 22° | green steady |
| 22° to 180° | red flashing 4 cps. |

11. A system according to claim 10 including means to indicate the operability of the system components.

12. A vehicular in-flight attitude indicating system for a pilot's cockpit comprising
    spaced actuatable discrete visual signals oriented substantially parallel to an axis which is transverse to the longitudinal axis of said vehicle and positioned within said pilot's normal peripheral vision space defined by a cone, the axis of which is substantially parallel to said longitudinal axis and whose apex is substantially at said pilot's point of vision when said pilot is in his normal in-motion operational and navigational duties, the central angle of said cone no greater than about 160°, each of said spaced signals comprising pairs of adjacent vertically oriented light sources, one light source, of said pair, of a first color, and the other light source of a second color, and
    means to actuate one pair of signals relative to the degree of roll about an axis parallel to the longitudinal axis of said vehicle from a normal horizontal position approximately as follows:

| Degree of Roll | Visual Signal |
| --- | --- |
| 0° to 3° | none |
| 3° to 10° | first color flashing 1 cps (cycle per second) |
| 10° to 18° | first color flashing 2 cps |
| 18° to 22° | first color steady |
| 22° to 180° | second color flashing 4 cps |

13. A system according to claim 12 wherein the colors for each pair are red above green.

14. A system according to claim 13 including means to actuate one pair of signals relative to the degree of roll about an axis parallel to the longitudinal axis of said vehicle from a normal horizontal position approximately as follows:

| Degree of Roll | Visual Signal |
| --- | --- |
| 0° to 3° | none |
| 3° to 10° | green flashing 1 cps (cycle per second) |
| 10° to 18° | green flashing 2 cps |
| 18° to 22° | green steady |
| 22° to 180° | red flashing 4 cps. |

* * * * *